US009135690B2

(12) United States Patent
Farid et al.

(10) Patent No.: US 9,135,690 B2
(45) Date of Patent: Sep. 15, 2015

(54) PERCEPTUAL RATING OF DIGITAL IMAGE RETOUCHING

(71) Applicant: The Trustees of Dartmouth College, Hanover, NH (US)

(72) Inventors: Hany Farid, White River Junction, VT (US); Eric Kee, Hanover, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 302 days.

(21) Appl. No.: 13/683,954

(22) Filed: Nov. 21, 2012

(65) Prior Publication Data

US 2013/0129234 A1    May 23, 2013

Related U.S. Application Data

(60) Provisional application No. 61/562,934, filed on Nov. 22, 2011, provisional application No. 61/606,775, filed on Mar. 5, 2012.

(51) Int. Cl.
*G06K 9/62* (2006.01)
*G06T 7/00* (2006.01)

(52) U.S. Cl.
CPC ............. *G06T 7/0002* (2013.01); *G06T 7/003* (2013.01); *G06T 2207/30196* (2013.01); *G06T 2207/30201* (2013.01)

(58) Field of Classification Search
CPC .................. G06T 7/0002; G06T 2207/30196; G06T 7/003; G06T 2207/30201
USPC ............................ 345/619; 382/228, 254, 275
See application file for complete search history.

(56) References Cited

U.S. PATENT DOCUMENTS

| 7,881,548 | B2* | 2/2011  | Ono ............................... 382/254 |
| 7,973,977 | B2* | 7/2011  | Thurston, III ................ 358/3.26 |
| 8,432,402 | B2* | 4/2013  | Ryu ................................ 345/501 |
| 8,588,545 | B2* | 11/2013 | Wedi et al. .................... 382/275 |
| 8,781,175 | B2* | 7/2014  | Wang et al. .................... 382/112 |
| 2007/0223830 | A1* | 9/2007 | Ono ............................... 382/254 |
| 2010/0158342 | A1  | 6/2010 | Iizuka |
| 2010/0188512 | A1  | 7/2010 | Simske et al. |

(Continued)

FOREIGN PATENT DOCUMENTS

| KR | 1020100104844 A | 9/2010 |
| KR | 1020110066011 A | 6/2011 |
| WO | 2010125041 A1 | 11/2010 |

OTHER PUBLICATIONS

International Search Report and Written Opinion in PCT Patent Application PCT/US2012/066385, issued Feb. 28, 2013, 10 pages.

*Primary Examiner* — Gregory M Desire
(74) *Attorney, Agent, or Firm* — Lathrop & Gage LLP

(57) ABSTRACT

A method is provided for automatically providing a digital image rating of photo retouching. The method includes the step of receiving at a computer, including a processor, a first set of pixel data of an original image and a second set of pixel data of a retouched image. The method also includes using the processor to determine a plurality of geometric statistics and a plurality of photometric statistics from the first and second sets of pixel data. The method further includes the step of using the processor to quantify a rating of the retouched image based upon the geometric statistics and photometric statistics to indicate deviation of the retouched image from the original image. A system is also provided to perform the steps.

31 Claims, 12 Drawing Sheets

(56) References Cited

U.S. PATENT DOCUMENTS

2011/0063322 A1* 3/2011 Takabayashi et al. ........ 345/619
2013/0044947 A1* 2/2013 Brandt et al. ................. 382/165
2013/0129234 A1* 5/2013 Farid et al. .................... 382/228

* cited by examiner

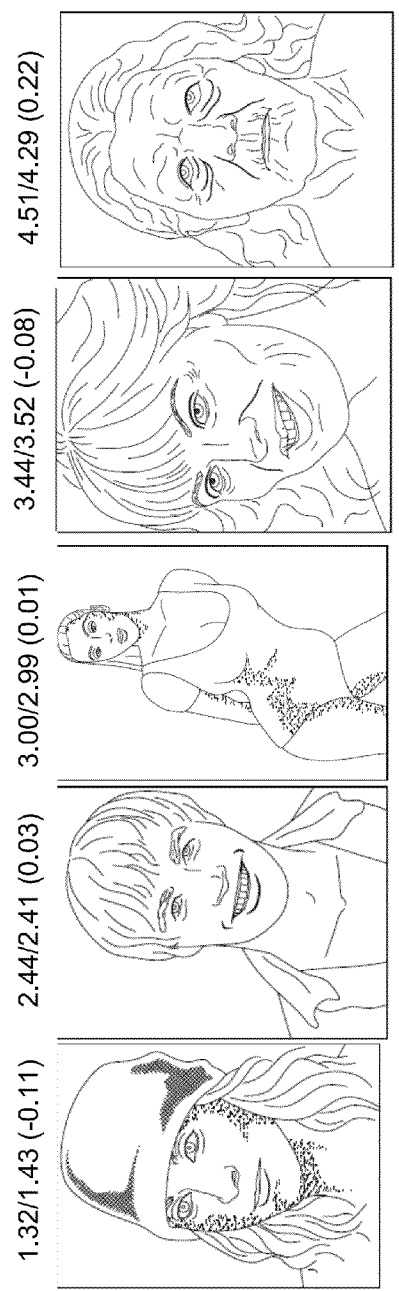
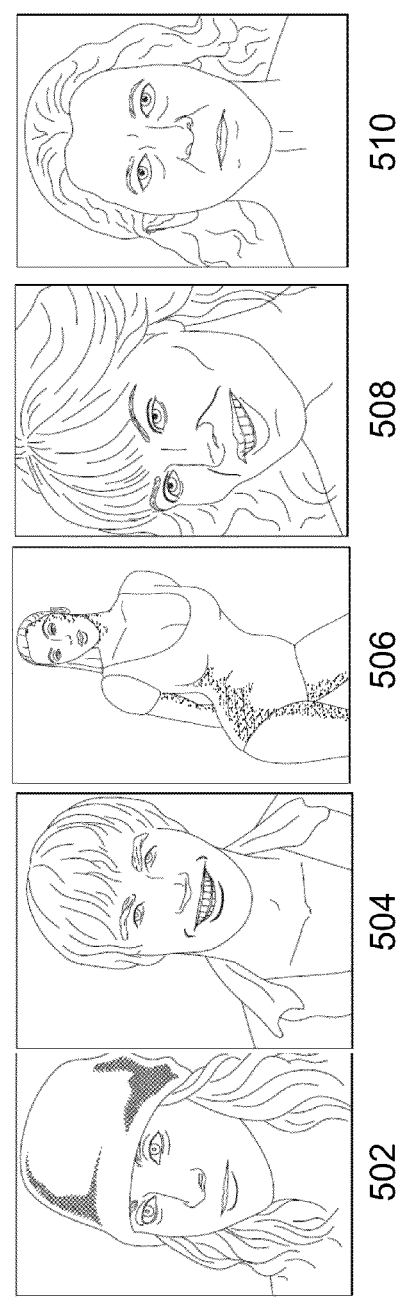

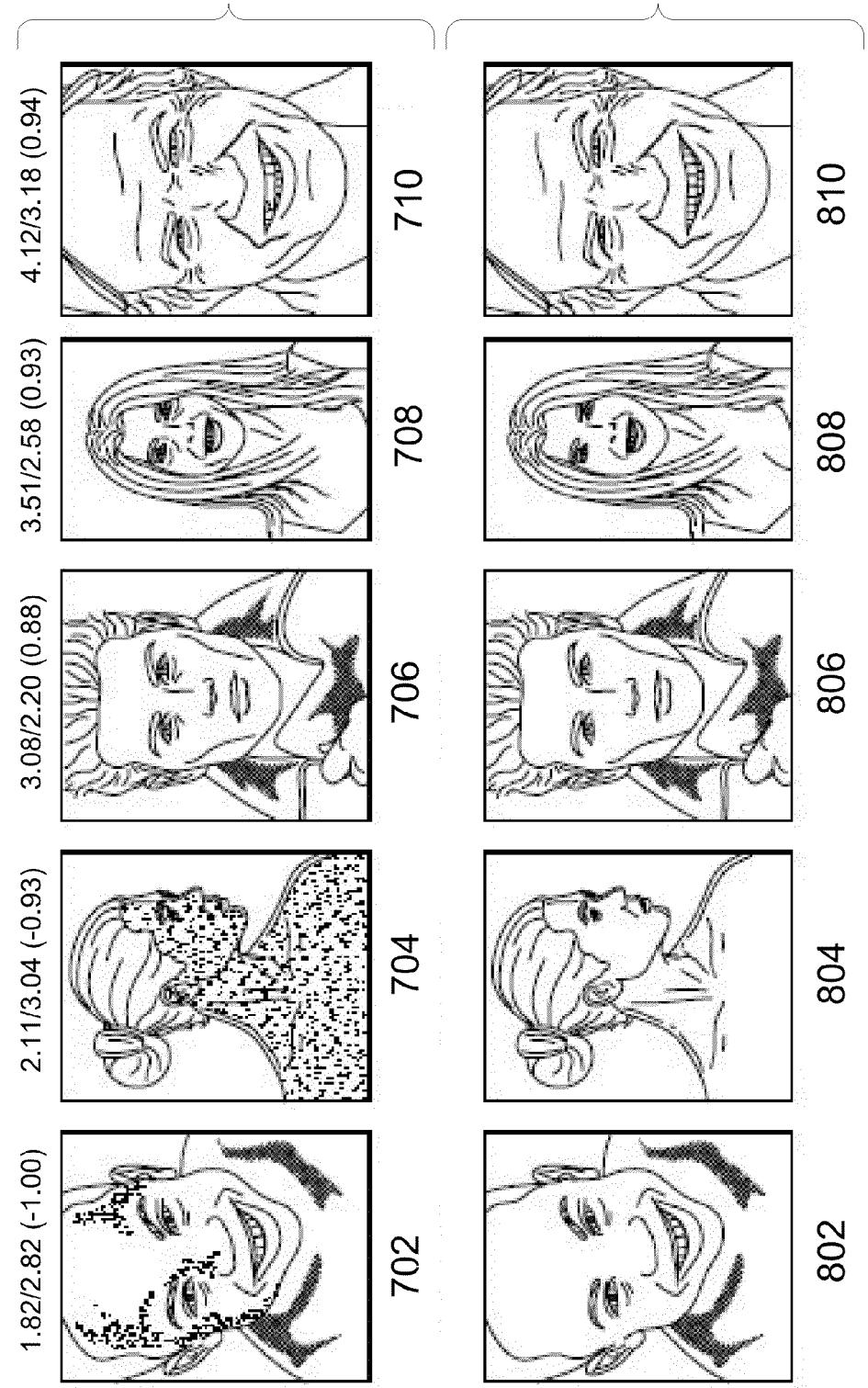

PERCEPTUAL RATING OF DIGITAL IMAGE RETOUCHING

RELATED APPLICATIONS

This application claims the benefit of priority to U.S. Provisional Patent Application Ser. No. 61/562,934, filed Nov. 22, 2011, which is incorporated by reference herein. This application further claims the benefit of priority to U.S. Provisional Patent Application Ser. No. 61/606,775, filed on Mar. 5, 2012, which is incorporated by reference herein.

GOVERNMENT INTERESTS

This invention was made with government support under contract number cns-0708209 awarded by the national science foundation (NSF). The government has certain rights in the invention.

BACKGROUND

In recent years, advertisers and magazine editors have been widely criticized for taking digital image retouching to an extreme. Impossibly thin, tall, and wrinkle- and blemish-free models are routinely splashed onto billboards, advertisements, and magazine covers. The images, however, are often the result of digital image retouching.

Retouched images are ubiquitous and have created an idealized and unrealistic representation of physical beauty. A significant amount of literature has established a link between these images and men's and women's satisfaction with their own physical appearance. Such concern for public health has led the American Medical Association to recently adopt a policy to "discourage the altering of photographs in a manner that could promote unrealistic expectations of appropriate body image." Concern for public health and for the general issue of truth in advertising has also led the United Kingdom, France, and Norway to consider legislation that would require digitally altered images to be labeled.

Popular image-editing software, such as Adobe Photoshop, allows photo editors to easily alter a person's appearance. These alterations may affect the geometry of the subject and may include slimming of legs, hips, and arms, elongating the neck, improving posture, enlarging the eyes, or making faces more symmetric. Other photometric alterations affect skin tone and texture. These changes may include smoothing, sharpening, or other operations that remove or reduce wrinkles, cellulite, blemishes, freckles, and dark circles under the eyes. A combination of geometric and photometric manipulations allows image retouchers to subtly or dramatically alter a person's appearance.

SUMMARY

In an embodiment, a method is provides an image retouching rating. The method includes the step of receiving at a computer including at least one processor a first set of pixel data of an original digital image and a second set of pixel data of a retouched digital image. The method also includes using the at least one processor to determine a plurality of geometric statistics and a plurality of photometric statistics from the first and second sets of pixel data. The method further includes the step of using the at least one processor to generate a rating of the retouched image based upon the geometric statistics and photometric statistics to indicate deviation of the retouched image from the original image.

In another embodiment, the method further includes determining a plurality of geometric statistics comprising a first mean and a first standard deviation of geometric distortion of retouching, between the first and second sets of pixel data, corresponding to a first portion of a human body. In certain embodiments, the first portion of the human body is a portion of the face.

In another embodiment, the method further includes determining a second mean and a second standard deviation of geometric distortion of retouching, between the first and second sets of pixel data, corresponding to a second portion of the human body, wherein the second portion is different from the first portion.

In another embodiment, the method further includes determining a plurality of photometric statistics including a third mean and a third standard deviation, between the first and second sets of pixel data, of the frequency response of a linear filter corresponding to a first portion of the human body.

In yet another embodiment, the method further includes determining a plurality of photometric statistics including a fourth mean and fourth standard deviation of structural similarity (SSIM) characterized by contrast and structural modification.

In yet another embodiment, the step of generating includes executing, using the processor, a non-linear support vector regression (SVR) to compute the image retouching rating based upon the plurality of statistics and characterization data defining the training parameters of the SVR.

In another embodiment, the method further includes determining, within a touchup filter, whether the retouched image is to be displayed by a browser based upon the image retouching rating and a rating threshold; displaying the retouched image within the browser when the retouched image is to be displayed, and displaying an image outline within the browser when the retouched image is not to be displayed; wherein the browser is in communication with a web server.

In another embodiment, the method further includes defining within a browser, a rating selector that specifies a maximum image retouching rating value for retouched images to be displayed within the browser; sending the maximum image retouching rating value to a web server in communication with the browser; and receiving a webpage for display within the browser with at least one retouched image having an image retouching rating equal or less than the maximum rating value.

A system is also provided to perform the steps in the above embodiments. Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings.

BRIEF DESCRIPTION OF THE DRAWINGS

FIG. 4 illustrates five representations of five original digital images.

FIG. 5 illustrates five representations of the five original images of FIG. 4 after retouching.

FIG. 7 illustrates five representations of another five original digital images.

FIG. 8 illustrates five representations of the five original images of FIG. 7 after retouching.

DETAILED DESCRIPTION OF THE EMBODIMENTS

Figure 1:
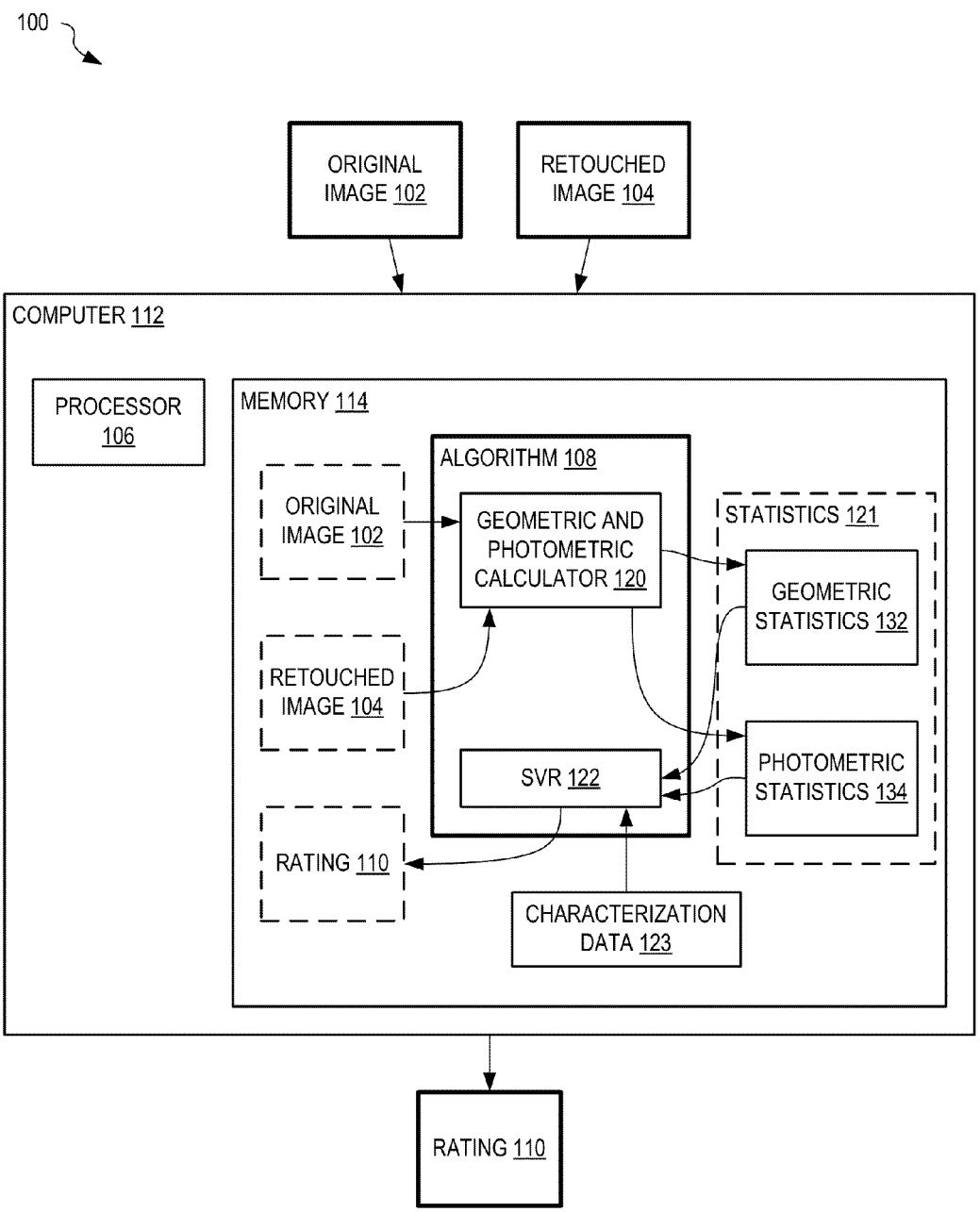
FIG. 1 is a block diagram illustrating one exemplary system for generating a perceptual rating of digital image retouching, in an embodiment.

The present disclosure may be understood by reference to the following detailed description taken in conjunction with the drawings as described below. For purposes of illustrative clarity, certain elements in the drawings are not drawn to scale.

This application discloses, among other things, how to automatically compute a quantitative and perceptually meaningful rating of image retouching. The application also discloses rating a photograph based upon a degree by which the photograph has been digitally altered by explicitly modeling and estimating geometric and photometric changes. This rating has been demonstrated to correlate well with perceptual judgments of image retouching and may be used to objectively judge by how much a retouched image has strayed from reality.

Benefits of the disclosed methods and systems may include providing a perceptually relevant rating of image retouching that helps find a balance between the competing interests of editing images for selling products and discouraging photographic alterations that promote unrealistic expectation of body image. Providing an image retouching rating alongside a published image may inform the public of the extent to which images have strayed from reality. Such a rating may also provide incentive for publishers and models to reduce usage of the more extreme forms of digital image retouching that are common today. This rating may also help image retouchers and editors because, even when original and retouched images are available, it is often difficult to see and quantify the extent of image alterations.

Benefits of the disclosed methods and systems may also include providing a fast and automatic rating to users and publishers. The core computational component of the disclosed system is typically fully automatic, however a user may annotate the hair/head, face, and body in certain embodiments. When deploying an industry-wide rating system, this annotation could either be done automatically or with fairly minimal user assistance.

The rating quantifies the perceptual impact of geometric and photometric retouching by modeling common image retouching techniques. Geometric changes are modeled, for example, with a dense locally linear, but globally smooth, motion field. Photometric changes are modeled, in certain embodiments, with a locally linear filter and a generic measure of local image similarity (SSIM). These model parameters are typically automatically estimated from the original and retouched images. The extent of image manipulation is, for example, quantified with eight summary statistics extracted from these models.

FIG. 1 is a block diagram illustrating one exemplary system 100 for generating a perceptual rating of digital image retouching. System 100 includes a computer 112 which has at least one processor 106 and an algorithm 108 comprising machine readable instructions stored in a memory 114.

In one embodiment, algorithm 108 includes a geometric and photometric calculator 120 for determining statistics 121, and a support vector regression (SVR) 122 for generating rating 110 based upon characterization data 123, geometric statistics 132 and photometric statistics 134.

Geometric statistics 132 and photometric statistics 134 (together, statistics 121), of FIG. 1, are extracted by geometric and photometric calculator 120 by comparing the original image 102 to the retouched image 104. In one embodiment, the amount of photo distortion or perceptual distortion is quantified from eight summary statistics 121 that are extracted from geometric and photometric models. These statistics consist of four geometric measurements (e.g., geometric statistics 132) and four photometric measurements (e.g., photometric statistics 134).

For example, geometric statistics 132 determined by calculator 120 may use an 8-parameter affine model that is used to model a geometric transformation between local regions in the before and after images, e.g., original and retouched images. The luminance transformation is modeled with a 2-parameter model embodying brightness and contrast. This 8-parameter model is given by:

$$cf_a(x,y)+b=f_b(m_1x+m_2y+t_x,m_3x+m_4y+t_y), \quad [1]$$

where $f_b$ and $f_a$ are the local regions of the before and after images, c and b are contrast and brightness terms, $m_i$ are terms of a two by two affine matrix, and $t_x$ and $t_y$ are translation terms. The luminance terms c and b are incorporated only so that the geometric transformation can be estimated in the presence of luminance differences between the before and after images or the original and retouched images.

A quadratic error function in these parameters is defined, for example, by approximating the right-hand side of Equation (1) with a first-order truncated Taylor series expansion. This error function is then minimized using standard least-squares optimization. Because these geometric parameters are estimated locally throughout the image, the resulting global transformation can lead to unwanted discontinuities. A global penalty on large motions and a smoothness constraint are imposed by penalizing the local model parameters proportional to their magnitude and the magnitude of their local gradient. The addition of this smoothness constraint requires an iterative minimization which is boot-strapped with the result of the least-squares optimization. This optimization is embedded within a coarse-to-fine differential architecture in order to contend with both large- and small-scale geometric changes. A model of missing data is also incorporated that contends with the case when portions of the after image have been entirely removed or added relative to the before image.

Once estimated, the geometric transformation is represented as a dense two-dimensional (2D) vector field:

$$\vec{v}(x, y) = \begin{pmatrix} m_1 x + m_2 y + t_x - x \\ m_3 x + m_4 y + t_y - y \end{pmatrix}. \quad [2]$$

This estimation is performed only on the luminance channel of a color image. The before and after images initially are histogram equalized to minimize any overall differences in brightness and contrast. The background in each image is replaced with white noise in order to minimize any spurious geometric distortion. This geometric model embodies the basic manipulation afforded by, for example, the Photoshop liquify tool used by photo retouchers to alter the global or local shape of a person.

In this example, the first two geometric statistics (e.g statistics 1-2) are the mean and standard deviation of the magnitude of the estimated vector field v(x,y), shown in Equation [2], projected onto the gradient vector of the underlying luminance channel. This projection emphasizes geometric distortions that are orthogonal to image features, which are more perceptually salient. These two statistics are computed only over the face region, which quantify geometric facial distortion. The third and fourth geometric statistics (e.g statistics 3-4) are the mean and standard deviation of the magnitude of the estimated vector field v(x,y), Equation [2], projected onto the gradient vector and computed over the body region. These projected vectors are weighted based on specific body regions.

In a particular embodiment, the bust/waist/thigh regions are weighted by a factor of 2, the head/hair regions are weighted by a factor of ½, and the remaining body regions have unit weight (a full range of weights were explored and the final results are not critically dependent on these specific values). These two statistics quantify geometric body distortion, and are computed separately from the facial distortion because observers weight facial and body distortions differently.

Photometric statistics 134 are for example determined by calculator 120 using either a linear filter model or a similarity measure SSIM. For example, basic photometric retouches between local regions in the after image, i.e. the retouched image, and the geometrically aligned before image, i.e. the original image, are modeled with a linear filter h(x,y), of size nine by nine pixels, given by:

$$f_a(x,y) = h(x,y) \star \tilde{f}_b(x,y), \quad [3]$$

where ★ is the convolution operator, and $f_b$ is the geometrically aligned before image region, Equation (1). The filter h(x,y) is estimated locally using a conjugate gradient descent optimization with a Tikhonov regularization. The regularization is used to enforce symmetry (i.e., zero-phase) on the estimated filter h. This estimation is performed only on the luminance channel of a color image.

Photometric retouches that are not captured by Equation [3] are measured with the similarity measure SSIM. This measure embodies contrast and structural retouches C(x,y) as follows:

$$C(x,y) = c(x,y)^\beta s(x,y)^\gamma, \quad [4]$$

$$c(x, y) = \frac{2\sigma_a \sigma_b + C_2}{\sigma_a^2 + \sigma_b^2 + C_2} \text{ and } s(x, y) = \frac{\sigma_{ab} + C_3}{\sigma_a \sigma_b + C_3}, \quad [5]$$

where $\sigma_a$ and $\sigma_b$ are the standard deviations of the image regions $f_a$ and $\sim f_b$, and $\sigma_{ab}$ is the covariance of $f_a$ and $\sim f_b$. The various constants are $\beta=1$, $\gamma=1$, $C_2=(0.03)^2$, and $C_3=C_2/2$. Note that in this implementation of SSIM the brightness term is excluded because it does not impact observers' judgments. For the same reason, SSIM is computed only on the luminance channel of a color image. This photometric model embodies special effects afforded by various Photoshop filters.

In this particular example, the first two photometric statistics (e.g. statistics 5-6) are the mean and standard deviation of the structural similarity (SSIM) or contrast and structural modification C(x,y), in Equation [4], computed over the face region. The third and fourth photometric statistics (e.g. statistics 7-8) are a measure D of the frequency response of the linear filters h(x,y), shown in Equation [3]. D is expressed as the following:

$$D = \Sigma_\omega |\tilde{F}_b(\omega)| \omega - \Sigma_\omega |H(\omega) \tilde{F}_b(\omega)| \omega, \quad [6]$$

where $H(\omega)$ and $\sim \tilde{F}_b(\omega)$ are unit-sum normalized one-dimensional (1D) frequency responses of the filter h and the local region $\sim f_b$ which are computed by integrating their 2D Fourier transforms across orientation. The parameter D is positive when h is a blurring filter, negative when h is a sharpening filter, and is tailored to the analysis of people in which filtering is commonly used to remove or enhance facial features. The mean and standard deviation of parameter D, computed over the face region, are the final two statistics.

In summary, a total of eight summary statistics have been described. The first four geometric statistics are mean and standard deviation of the estimated vector field computed separately over the face and body. The second four photometric statistics are the mean and standard deviation of SSIM and the frequency response of the linear filters.

Characterization data 123 is, for example, defines a set of training parameters used to train the SVR model 122 used by algorithm 108. To generate characterization data 123, for example, four hundred sixty eight before/after images were collected from a variety of on-line resources, primarily the websites of photo retouchers showcasing their services. These images spanned the range from minor to radical amounts of retouching.

A group of 390 observers was recruited to perform perceptual ratings through Amazon's Mechanical Turk. This crowd sourcing utility has become popular among social scientists as a way to quickly collect large amounts of data from human observers around the world. Observers were initially shown a representative set of 20 before/after images in order to help them gauge the range of distortions they could expect to see. Observers were then shown 70 pairs of before/after images and asked to rate how different the person looked between the images on a scale of "1" to "5". A score of "1" means "very similar" and a score of "5" means "very different." This yielded a total of 50 ratings per each of 468 images. The presentation of images was self-timed and observers could manually toggle between the before and after images as many times as they chose (observers are better able to see the amount of retouching within the images when toggling rather than viewing side-by-side). In order to measure the consistency of observer responses each observer rated a random set of five images three times each. The presentation of these images was evenly distributed throughout the trial. Each observer was paid $3 for their participation and a typical session lasted 30 min. Given the uncontrolled nature of the data collection, some data filtering was necessary. Approximately 9.5% of observers were excluded because they frequently toggled only once between the before and after image and they responded with high variance on the repeated trials.

The SVR technique was used to generate characterization data 123 as a mapping between the observer ratings and eight summary statistics (e.g., statistics 121) extracted from the geometric and photometric models of photo retouching at step 324. Each statistic was individually scaled into the range [−1, 1]. Specifically, a nonlinear SVR with a Gaussian radial basis kernel was employed. A leave-one-out cross-validation was performed in which the SVR was trained on 467 of 468 image ratings and tested on the remaining image. This training and testing was repeated 468 times in which each image was individually tested. The SVR has two primary degrees of freedom: (1) the scalar $\gamma$ specifies the spatial extent of the kernel function; and (2) the scalar c specifies the penalty applied to deviations of each data point from the regression function. These parameters were selected by performing a dense 2D grid search to maximize the correlation coefficient of each training set. The results of the above crowd sourcing technique may then be stored into memory 114 as characterization data 123.

Processor 106 executes algorithm 108 to process original digital image data 102 and retouched digital image data 104. Those skilled in the art would appreciate that algorithm 108 may be executed by multiple processors 106. Algorithm 108 further generates an output a rating 110 indicating deviation of the retouched digital image data 104 from the original digital image data 102. Output rating 110 may be stored within memory 114, or transferred as an output to exterior devices other than computer 112. In one embodiment, algorithm 108 also includes an eight parameter model. Memory 114 may represent one or more of a magnetic or optical disk and/or an electronic memory integrated circuit (e.g., RAM, ROM, FLASH, and so on).

Figure 2:
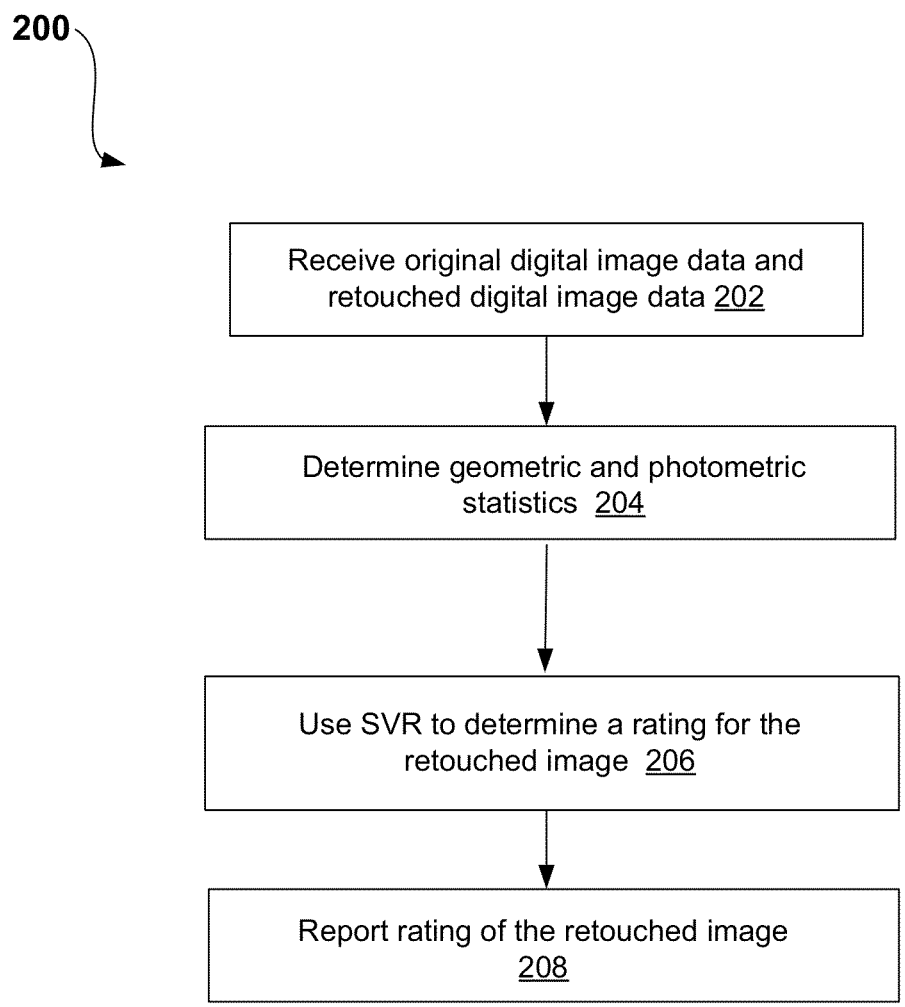
FIG. 2 is a flow chart illustrating of one exemplary method for determining a perceptual rating of digital image retouching using the system of FIG. 1, in an embodiment.

FIG. 2 is a flow chart illustrating of one exemplary method 200 for determining a perceptual rating of digital image retouching using system 100 of FIG. 1. Method 200 is for example implemented, at least in part, within algorithm 108 of computer 112. In step 202, method 200 receives, within computer 112, original digital image data and retouched digital image data. In step 204, geometric and photometric statistics (e.g., statistics 121) are for example determined using processor 106. In step 206, method 200 uses algorithm 108, for example an SVR algorithm, to determine a rating 110 for the retouched image based upon the statistics 121 and characterization data 123. Step 206 is performed, for example, at least partially by using processor 106. In step 208, method 200 reports the rating 110 of the retouched image.

Figure 3:
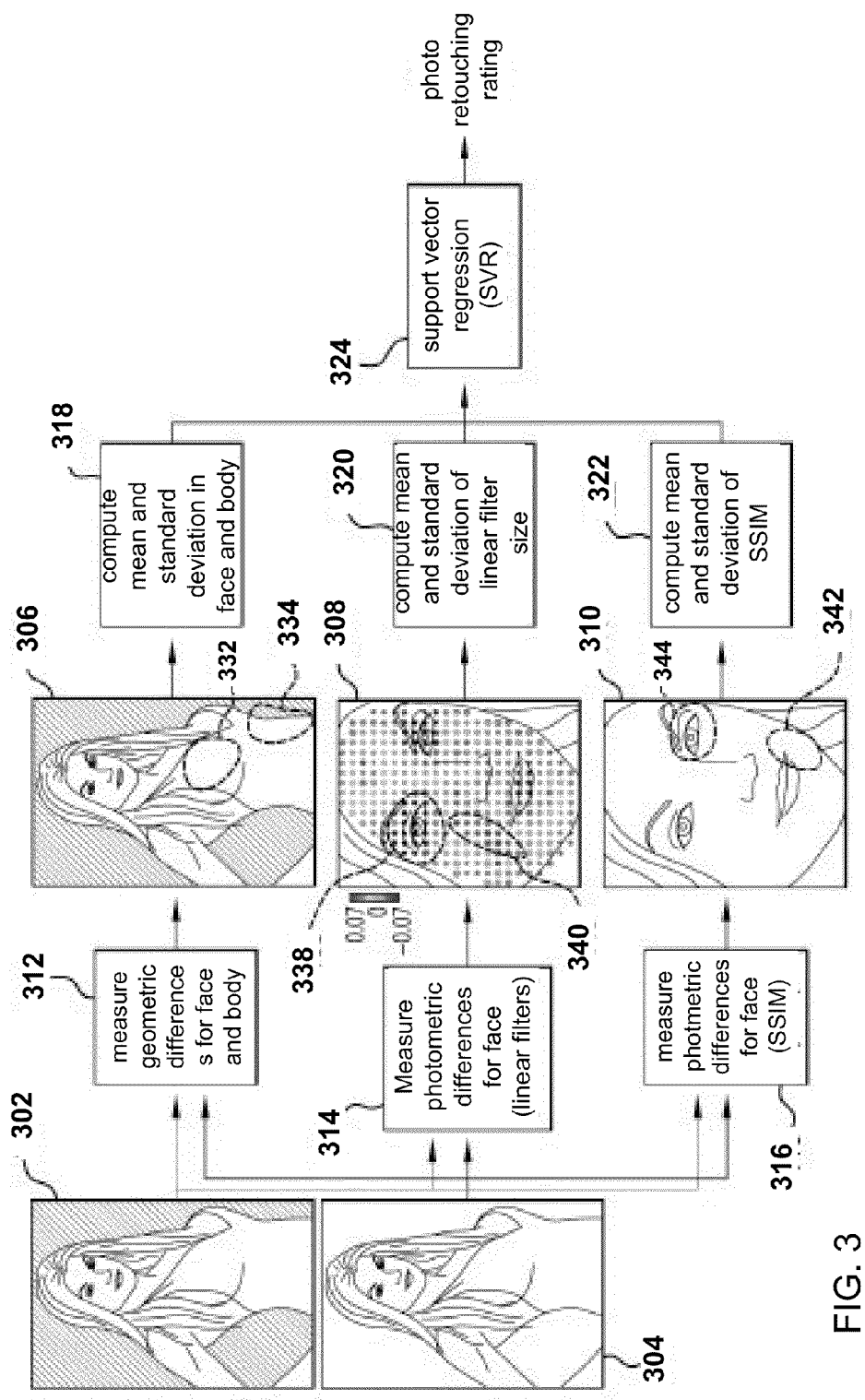
FIG. 3 illustrates one exemplary algorithm for determining a perceptual rating of digital image retouching, in an embodiment.

FIG. 3 shows representations of an original digital image 302, a retouched digital image 304, and a visualization of the steps required to create a rating of digital image retouching, for example, by measuring geometric and photometric retouching. An image 306 represents measured geometric distortions that are depicted as a vector field, where a superimposed color coding corresponds to vector magnitude. For clarity of illustration, area 332 near the breast and area 334 near the waist are shown in dashed outline and represent areas with higher vector magnitude numbers that correspond to greater distortion. An image 308, also within FIG. 3, represents measured photometric distortions quantified by a linear filter, in which area 340 near the cheek has positive values denoting blurring and area 338 near the eye has negative values denoting sharpening. An image 310 represents structural similarity (SSIM) where areas 342 and 344, near the eyes and mouth, respectively, have smaller values that denote larger image differences.

Step 312 uses Equation [1] to measure geometric differences for face and body with eight parameters and then computes vector field based upon six of the eight parameters using Equation [2]. Step 318 computes mean and standard deviation of magnitude of the vector in face and body. Step 314 uses Equation [3] to measure photometric differences for the face and then uses Equations [6] to calculate the measure D. Step 320 computes mean and standard deviation of D. Step 316 uses Equations [4] and [5] to measure photometric differences for the face and computes C(x,y). Step 322 computes mean and standard deviation of C(x,y).

In step 324, machine learning techniques, such as SVR, are then used to relate these summary statistics to perceptual judgments made by human observers. It is shown below, in FIGS. 4-8, that the summary statistics combine to yield a metric that correlates well with perceptual ratings of photo alteration.

FIG. 5 illustrates five representative retouched digital images 502, 504, 506, 508, and 510 with a minimal prediction error from original digital images 402, 404, 406, 408, and 410, shown in FIG. 4. Shown along the top is how an average person rated the differences in these images (left), the predicted rating of photo retouching (right) using the present algorithm, and their difference (in parenthesis). An image with little to no retouching is rated a "1" while an image with significant retouching is rated a "5". The value in the parentheses is the difference between these two values.

Figure 6:
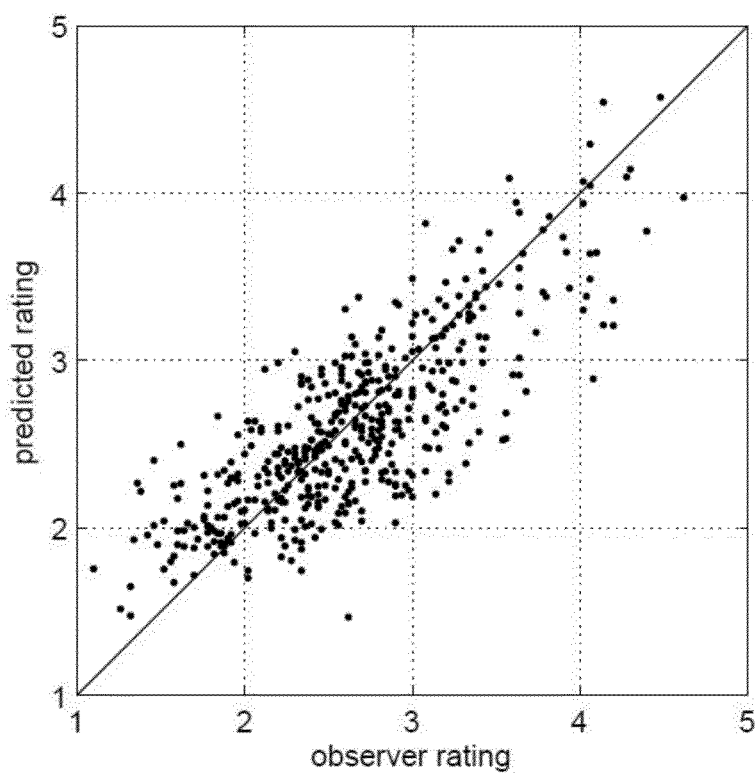
FIG. 6 illustrates exemplary results from a leave-one-out cross-validation using a nonlinear support vector regression (SVR) to correlate observer ratings of digital image retouching to the geometric and photometric measurements of digital image retouching.

FIG. 6 illustrates the correlation between the mean of 50 observer ratings per image and one exemplary of the present algorithm. Each data point corresponds to one of 468 images rated by the test group on a scale of 1 to 5. The predicted rating for each image was determined by training an SVR on 467 images using a leave-one-out cross-validation methodology. The R-value is 0.80, the mean/median absolute prediction error is 0.30/0.24 with a standard deviation of 0.24 and a max absolute error of 1.19. The absolute prediction error is below 0.5 for 81.4% of the images, and below 0.75 and 1.0 for 94.4% and 99.1% of the images, respectively.

FIG. 8 illustrates another set of representative retouched digital images 802, 804, 806, 808, and 810 with maximal prediction error from respective original digital images 702, 704, 706, 708, 710, shown in FIG. 7. A model of missing data is also incorporated that contends with the case when portions of the after image have been entirely removed or added relative to the before image. The over- and underestimations illustrate some of the limitations of the present model. The perceptual distortion in retouched digital image 802 is overestimated because there is a large photometric difference for the young boy (removal of blemishes). The perceptual distortion in retouched digital image 804 is overestimated because there is and a large geometric difference for the young woman (change in shape and position of the head). However, neither of these differences corresponds to a large perceptual difference in appearance. On the other hand, the perceptual distortion in the remaining retouched digital images 806, 808 and 810 is underestimated. The change to the symmetry of the young man's face, the addition of make-up to the woman, and the addition of teeth to the man are each relatively small from a photometric and geometric perspective but yield a large perceptual difference in appearance. Even with these limitations, the perceptual distortion is still reasonably measured over a diverse range of image alterations and content.

To determine which of the eight summary statistics were most critical for predicting observer ratings, we trained and tested 255 SVRs, one for each possible subset of size 1 to 8. The best performing SVR with one statistic consisted of the mean of the geometric facial distortion (statistic (1) as described above), which yielded an R-value of 0.58. The best performing SVR with two statistics consisted of the standard deviation of the geometric body distortion and the standard deviation of the photometric SSIM (statistics (4) and (6)), which yielded an R-value of 0.69. And, the best performing SVR with three statistics consisted of adding the standard deviation of the geometric facial distortion to the previous SVR (statistics (4), (5), and (6)), which yielded an R-value of 0.76. The best performing SVR of size 6 had an R-value of 0.80, equal to that of the full set of size 8. This subset of size 6 consisted of the statistics (1), (2), (4), (6), (7), and (8) as described above. Although six statistics are sufficiently powerful, they are extracted from each component of the geometric and photometric models. Therefore, there is little cost in using all eight statistics in terms of computational complexity or in terms of training the SVR.

A linear SVR was also tested to validate the use of a nonlinear SVR over a simpler linear SVR. The R-value for the linear SVR is 0.72, as compared to 0.80 for the nonlinear SVR. The mean absolute prediction error is 0.34 with a standard deviation of 0.27 as compared to 0.30 and 0.24 for the nonlinear SVR. The max absolute error jumps from 1.19 to 1.93. Overall, the nonlinear SVR affords a considerably better prediction of observer ratings as compared to a linear SVR.

The perceptual rating of the present disclosure is compared against two standard image similarity perceptual ratings. A perceptual rating based only on the mean and standard deviation of a standard application of SSIM yields an R-value of 0.52 as compared to our approach that had an R-value of 0.80. A perceptual rating based on only the mean squared error between the before and after image performed much worse with an R-value of only 0.30. Standard image similarity perceptual ratings perform poorly because they do not compensate for, or measure, large-scale geometric distortions.

Application of the Technology

In the above embodiments, the system compares original and retouched images of human subjects. However, the system may also be trained for comparing images of other subjects. For example, the system may be trained to compare images of landscape portraits, still-life, and wildlife. Similarly, the system may be trained to compare images of art restorations. For example, a rating of restored art may be used for evaluation purposes, wherein a poorly restored image may be awarded a high rating (indicating significant change to the image content).

Figure 9:
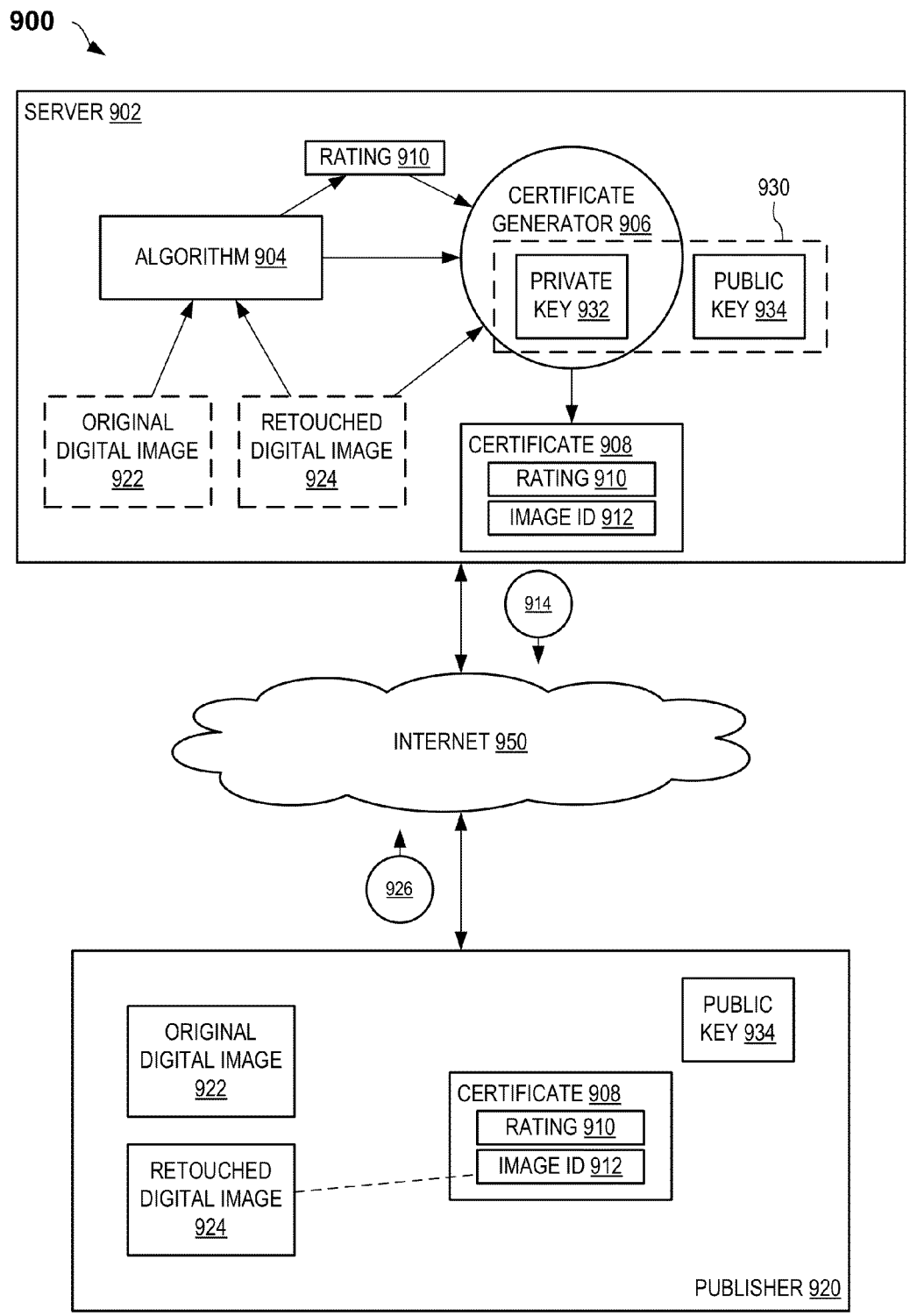
FIG. 9 shows one exemplary system for rating and certifying a retouched digital image, in an embodiment.

FIG. 9 shows one exemplary system 900 for rating and certifying a retouched digital image 924. System 900 includes a server 902, coupled with the Internet 950, and having an algorithm 904 and a certificate generator 906. Algorithm 904 may represent algorithm 108 and may implement method 200 of FIG. 2. Certificate generator 906 includes an encryption, and optionally a decryption, algorithm that utilizes a private key 932 of a public/private key pair 930, to generate a certificate 908 containing a rating 910. Certificate 908 may then be decrypted using public key 934 of public/private key pair 930.

Server 902 may represent one or more computers that are connected to Internet 950. For example, server 902 includes a memory and a processor (not shown for clarity of illustration) that respectively store and execute instructions of algorithm 904 and instructions of certificate generator 906.

In one example of operation, a publisher 920 desires to publish a retouched digital image 924 together with a certified rating that defines an amount of retouching applied to an original image 922 to form retouched digital image 924. Publisher 920 sends a message 926, containing original image 922 and retouched image 924, to server 902 requesting a certified rating of retouched image 924. Within server 902, algorithm 904 is executed to process original image 922 and retouched image 924 and to generate a rating 910. Certificate generator 906 utilizes private key 932 (known only to certificate generator 906) to generate certificate 908 containing rating 910 and an image ID 912 that uniquely identifies retouched image 924. In one example, image ID 912 is a checksum of data within retouched image 924. In another example, image ID 912 is retouched image 924.

Once certificate 908 is generated, server 902 sends certificate 908 to publisher 920 as message 914 for example. Message 914 may also contain public key 934. Publisher 920 decrypts certificate 908 using public key 934 and optionally verifies that rating 910 applies to retouched image 924 using image ID 912. Publisher 920 may retain certificate 908 as evidence of rating 910 for retouched image 924, for example, to show compliance to a rating standard.

Figure 10:
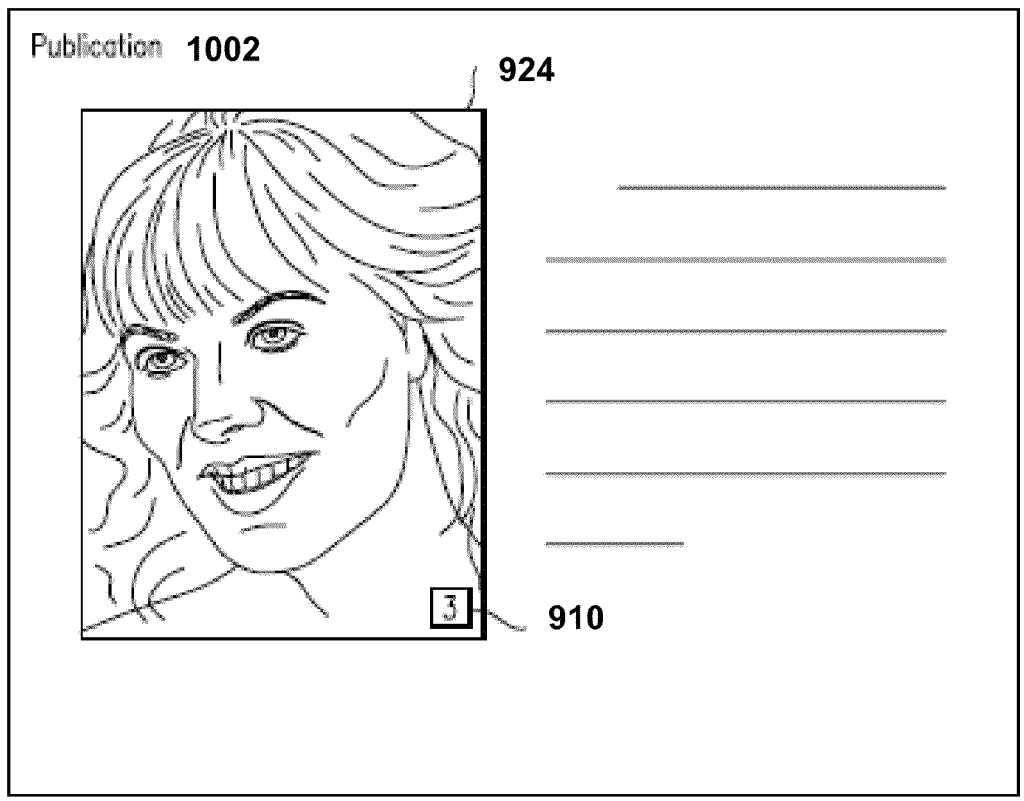
FIG. 10 shows an exemplary publication containing the retouched image and displaying a rating determined by the system of FIG. 9, in an embodiment.

FIG. 10 shows an exemplary publication 1002 generated by publisher 920 of FIG. 9 and containing retouched digital image 924 with rating 910 overlaid on the image. In one embodiment, system 900 retouches and returns retouched image 924 to include rating 910. Alternatively, rating 910 may be shown beside the image. In one embodiment, where publication 1002 is a web page, the user may click on rating 910 to retrieve and validate the rating certificate associated with rating 910. In another example, rating 910 is not shown unless the user clicks on (or causes a mouse-over event of) retouched image 924 wherein rating 910 is momentarily displayed.

The rating system may also be applied to other human judgments, wherein the system may predict how an object may be judged. For example, the rating may be applied to judging a photography contest, and rating images for a scientific journal.

Figure 11:
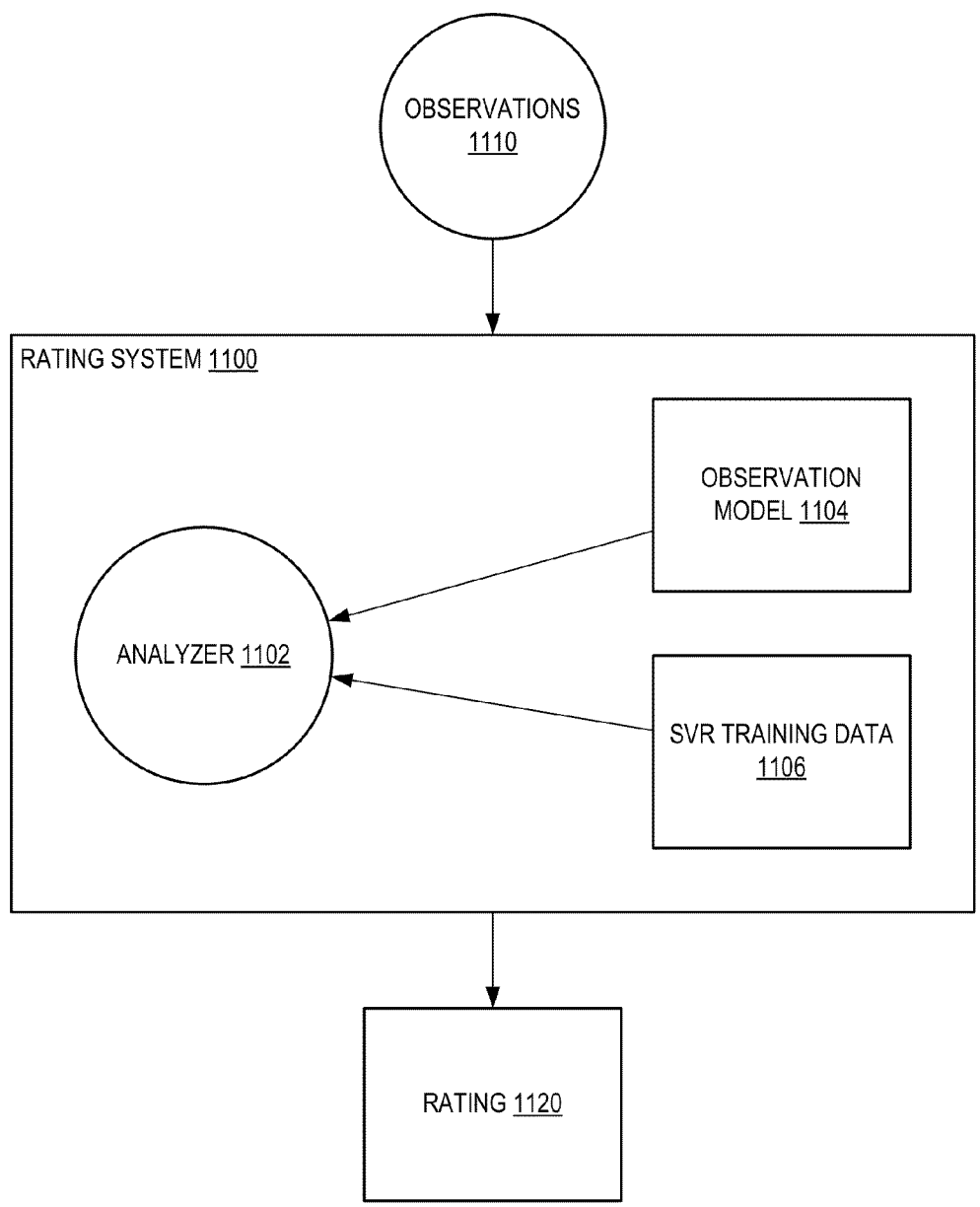
FIG. 11 shows one exemplary rating system configured for automatically rating observations based upon an observation model and SVR training data, in an embodiment.

FIG. 11 shows one exemplary rating system 1100 that may be configured for automatically rating observations 1110 based upon an observation model 1104 and SVR training data 1106. Observation model 1104 defined weightings for each of a plurality of features (data points) within digital images of observations 1110. Analyzer 1102 processes observations 1110 based upon observation model 1104 and then applies SVR training data 1106 to determine a rating 1120.

Observation model 1104 may be defined for any observable set of features that a user of system wishes to automatically rate. Using the example shown above (FIGS. 1-10), observations 1110 include retouched features of a human as determined by comparing an original digital image and a retouched digital image. Observation model 1104 is thus used to define the features within the images that are of interest, and defines a weighting for each of the features. Observation model 1104 may define parameters for features that are not always present within observations 1110, but that are applied when the feature is present.

The mathematical model may also be applied in reverse wherein a user may automatically retouch an image to have a desired rating. For example, where a magazine desires to publish only lightly retouched images, the system 1100 may be used to reduce the amount of retouching of a heavily retouched image until that image has a rating of 1, thereby meeting the magazine publishing criteria. Since system 900 measures geometric and photometric change between an original digital image and a retouched image, system 900 may be used to reduce the level of retouching of the retouched image until a determined rating thereof is at a desired rating level. Specifically, the geometric and photometric models are generative in nature, and define how an image is retouched from the original digital image to get to the retouched digital image.

Figure 12:
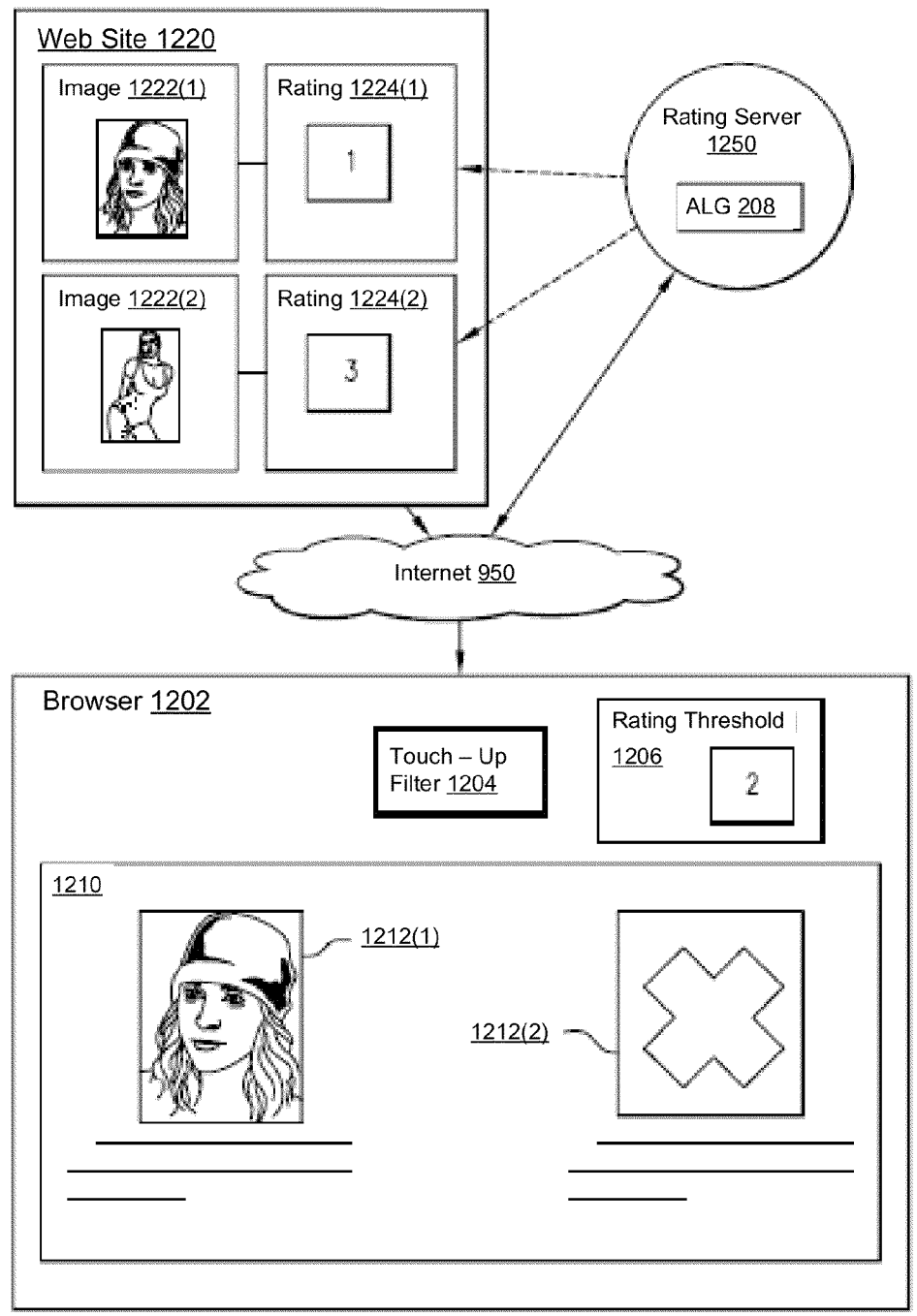
FIG. 12 shows exemplary use of ratings, generated by a rating server, by a browser when viewing a web site, in an embodiment.

FIG. 12 shows exemplary use of ratings 1224, generated by a rating server 1250, by a browser 1202 when viewing a web site 1220. Web site 1220 is shown with two exemplary retouched images 1222(1) and 1222(2) that each have a rating 1224(1) and 1224(2), respectively, generated by rating server 1250. Rating server 1250 utilizes algorithm 108 to determine ratings 1224 of images 1222 based upon those images and matching original untouched images, as previously described. In one embodiment, rating server 1250 is similar to rating server 902 of FIG. 9.

Browser 1202, operating on a user's computer for example, accesses web site 1220 via Internet 950 to generate a web page display 1210. Browser 1202 includes a touch-up filter 1204 that compares ratings 1224 of images 1222 received from web site 1220 to a rating threshold 1206 and does not display images that have a rating greater than rating threshold 1206.

In the example of FIG. 12, rating threshold 1206 has a value of 2, image 1222(1) has a rating 1224(1) with a value of 1, and image 1222(2) has a rating 1224(2) with a value of 3. Touch up filter 1204, in cooperation with browser 1202, allows image 1222(1) to be displayed as image 1212(1) within web page display 1210 because rating 1224(1) is less than or equal to rating threshold 1206. Touch-up filter 1204, in cooperation with browser 1202, prevents image 1222(2) from being displayed within web page display 1210 because rating 1224(2) is greater than rating threshold 1206. In one embodiment, browser 1202 displays an image placeholder 1212(2) to indicate where image 1222(2) would have been displayed within web page display 1210.

Figure 13:
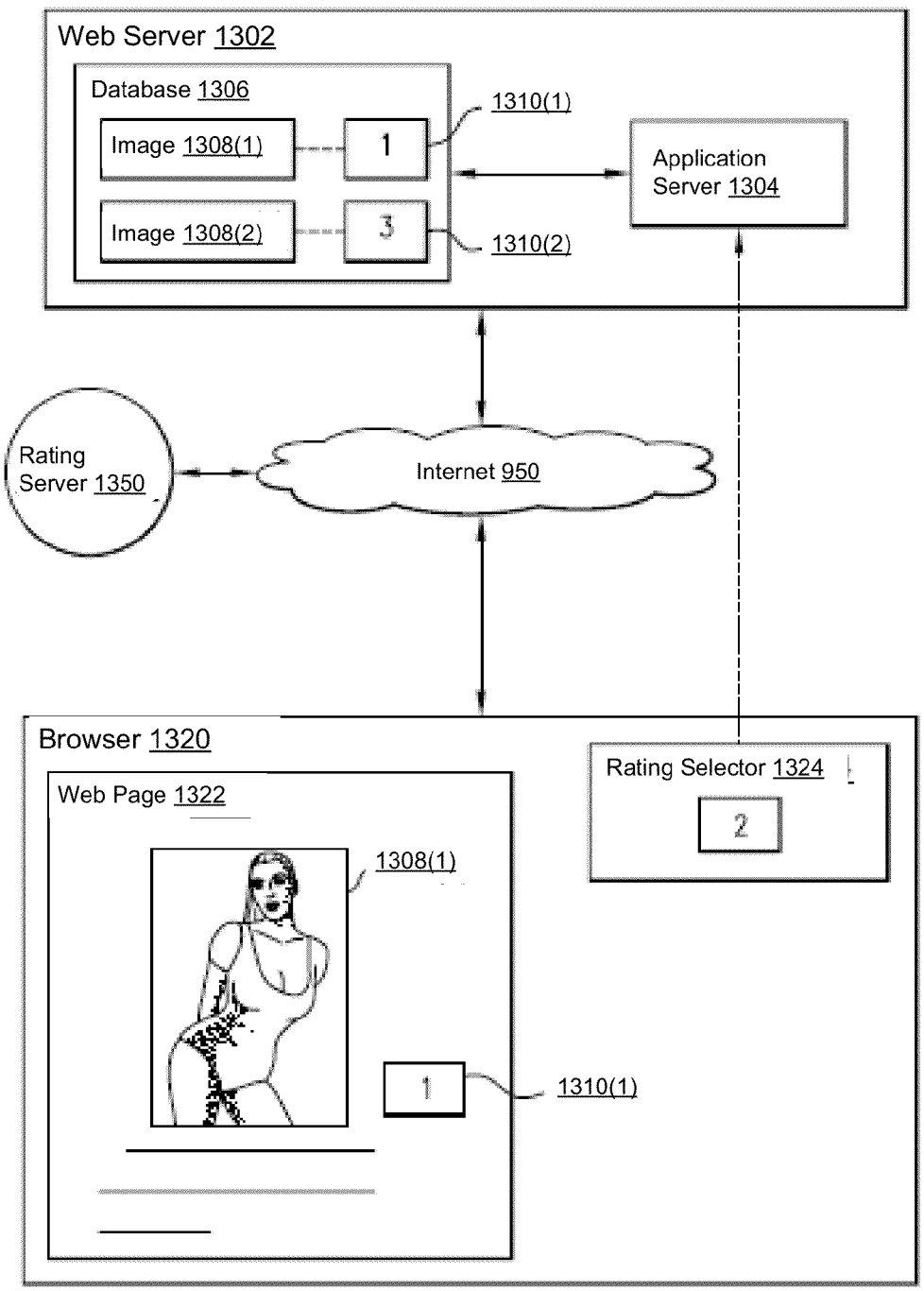
FIG. 13 shows exemplary selection of digital images for display within a web page display of a browser based upon ratings generated by rating server, in an embodiment.

FIG. 13 shows exemplary use of ratings 1310 generated by rating server 1350 to select images for display within a web page display 1322 of a browser 1320 based upon a rating selector 1308. Web server 1302 stores, within a database 1306 for example, at least two retouched images 1308(1) and 1308(2) of the same subject. Each retouched image 1308 has a different amount of "touch-up" and thereby receive ratings 1310, from rating server 1350, that have different values. In the example of FIG. 13, image 1308(1) has rating 1310(1) with a value of 1, and image 1308(2) has rating 1310(2) with a value of 3, thereby indicating that image 1308(2) has more touch-up than image 1308(1).

Browser 1320, running on a user's computer for example, has rating selector 1324 with a value of 2, indicating that browser should display images 1308 with rating 1310 values of 2 or less. An application server 1304, running on, or in communication with, web server 1302, generates web page 1322 for display within browser 1320 based upon a value of rating selector 1324. In the example of FIG. 13, rating selector 1324 has a value of 2, and application server 1304 generates web page 1322 with image 1308(1), and optionally the value of associated rating 1310(1), because rating 1310(1) has the highest value that is less than or equal to the value of rating selector 1324.

In one example of operation, rating selector 1324 forms part of a parental control setting for browser 1320 such that browser 1320 does not display images, such as image 1308(2), that have a rating (e.g., rating 1310(2)) value greater than the value of rating selector 1324.

In one embodiment, a file format is used that stores images 1308(1) and 1308(2) with the same file together with their respective rating values. This file format may store an original image, and any retouches that allow generation of retouched images for a desired rating value.

Figure 14:
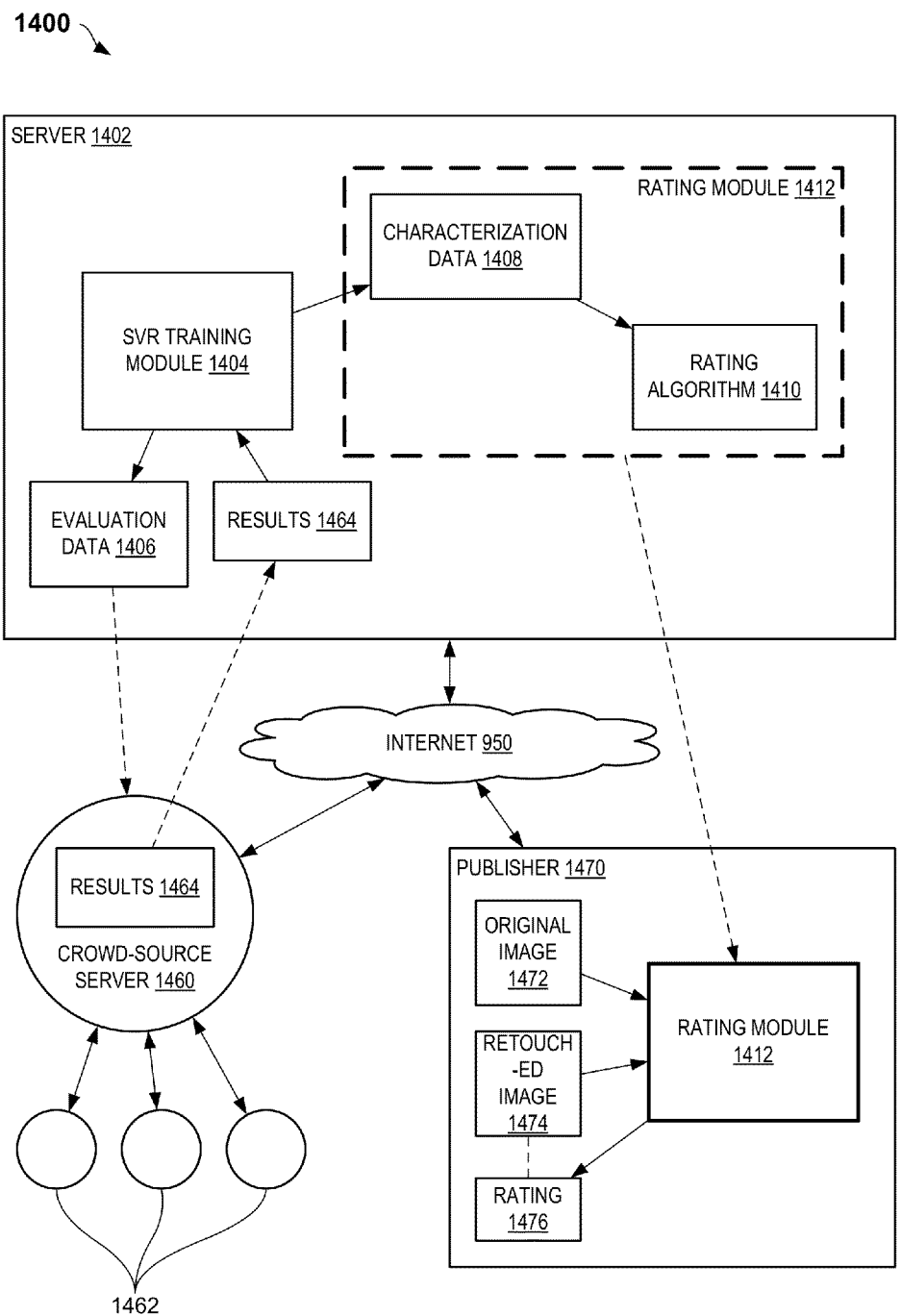
FIG. 14 shows one exemplary system for generating a rating module that automatically determines a rating for a retouched digital image in comparison to an original digital image, in an embodiment.

FIG. 14 shows one exemplary system 1400 for generating a rating module 1412 that automatically determines a rating for a retouched image 1474 in comparison to an original image 1472. System 1400 has a server 1402 that includes an SVR training module 1404, evaluation data 1406, and a rating algorithm 1410. Evaluation data 1406 includes a plurality of original images with a plurality of retouched images that are "touched-up" from the original images. Rating algorithm 1410 is characterized by characterization data 1408, generated by SVR training module 1404, to provide a rating evaluation of a retouched image as compared to an original image, as described above. Characterization data 1408 and rating algorithm 1410, in combination, form a rating module 1412 that may represent algorithm 108. Rating module 1412 may be operated on other computers, such as publisher 1470, to automatically determine a rating for a retouched image 1474 in comparison to an original image 1472.

In one example of operation, server 1402 sends, via Internet 950, evaluation data 1406 to a crowd-source server 1460, where a plurality of evaluators 1462 evaluate evaluation data 1406 to generate results 1464. Results 1464 include a rating value for each retouched image as perceived by each evaluator 1462, together with other values of the evaluator's interaction with crowded-source server 1460, such as one or more of time taken, a number of times the evaluator switched between each original and retouched image, and so on. Results 1464 are sent to server 1402 where they are processed by SVR training module 1404 to generate characterization data 1408 that controls rating algorithm 1410 to automatically rate a retouched image in comparison to an original image.

Once characterization data 1408 and rating algorithm 1410 are combined to form rating module 1412, rating module 1412 may be transferred to other computers to determine a rating of retouched images as compared to original images. In the example of FIG. 14, rating module 1412 is a software package that is purchased by publisher 1470 and used to rate retouched image 1474 against original image 1472 to determine rating 1476. Rating module 1412 is implemented as instructions, stored on computer readable media, that when executed by a processor determines the rating of the retouched image as described above.

Having described several embodiments, it will be recognized by those skilled in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

It should thus be noted that the matter contained in the above description or shown in the accompanying drawings should be interpreted as illustrative and not in a limiting sense. For example, the above example describe processing of two (original and retouched) digital images; however, the systems and methods may also be used to process video images, which may be considered a sequence of still images. The following claims are intended to cover generic and specific features described herein, as well as all statements of the scope of the present method and system, which, as a matter of language, might be said to fall there between.

What is claimed is:

1. A method for automatically providing an image retouching rating comprising:
   receiving, within a computer having a processor and memory, a first set of pixel data of an original image and a second set of pixel data of a retouched image;
   determining, from the first and second sets of pixel data using the processor, a plurality of statistics based upon deviation of the retouched image from the original image; and
   generating, using the processor, the image retouching rating to define a level of modification of the retouched image based upon the plurality of statistics.

2. The method of claim 1, wherein the step of determining the plurality of statistics comprises determining a plurality of geometric statistics and determining a plurality of photometric statistics.

3. The method of claim 1, wherein the step of determining the plurality of statistics comprises:
   determining a plurality of geometric statistics comprising a first mean and a first standard deviation of geometric distortion of retouching, between the first and second set of pixel data, corresponding to a first portion of a human body.

4. The method of claim 3, wherein the step of determining the plurality of geometric statistics further comprises:
   determining a second mean and a second standard deviation of geometric distortion of retouching, between the first and second sets of pixel data, corresponding to a second portion of the human body, wherein the second portion is different from the first portion.

5. The method of claim 3, wherein the first portion of the human body is a portion of the face.

6. The method of claim 3, wherein the step of determining the plurality of statistics further comprises executing, using the processor, an algorithm stored as computer readable instructions within the memory, to model a geometric transformation between the first and second sets of pixel data corresponding to respective local regions in the original image and the retouched image.

7. The method of claim 6, wherein the algorithm comprises an eight parameter model expressed by:

$$cf_a(x,y)+b=f_b(m_1 x+m_2 y+t_x, m_3 x+m_4 y+t_y)$$

wherein $f_a(x,y)$ and $f_b(x,y)$ are local regions of the original image and the retouched image, respectively, c and b are contrast and brightness terms, $m_i$ are terms of a two by two affine matrix, and $t_x$ and $t_y$ are translation terms.

8. The method of claim 3, wherein the geometric distortion is expressed as a magnitude of a vector field $v(x,y)$, wherein vector field $v(x,y)$ is expressed by $$\vec{v}(x,y) = \begin{pmatrix} m_1 x + m_2 y + t_x - x \\ m_3 x + m_4 y + t_y - y \end{pmatrix}.$$

9. The method of claim 1, wherein the step of determining the plurality of statistics comprises determining a plurality of photometric statistics comprising a third mean and a third standard deviation, between the first and second sets of pixel data, of the frequency response of a linear filter corresponding to a first portion of the human body.

10. The method of claim 9, wherein the frequency response is characterized by, $$D = \sum_\omega |\tilde{F}_b(\omega)|\omega - \sum_\omega |H(\omega)\tilde{F}_b(\omega)|\omega$$

wherein $H(\omega)$ and $\sim F_b(\omega)$ are unit-sum normalized one-dimensional (1D) frequency responses of the linear filter $h(x,y)$ and a local region $\sim f_b$, corresponding to the first portion of the human body, which are computed by integrating their 2D Fourier transforms across orientation,
wherein each linear filter $h(x,y)$ is characterized by:

$$f_a(x,y)=h(x,y) \star \tilde{f}_b(x,y)$$

wherein ★ is a convolution operator, and $f_a$ and $f_b$ are geometrically aligned after and before image regions, respectively.

11. The method of claim 1, wherein the step of determining the plurality of statistics comprises determining a plurality of photometric statistics comprising a fourth mean and a fourth standard deviation of structural similarity (SSIM) characterized by contrast and structural modification.

12. The method of claim 11, wherein the SSIM is characterized by contrast and structural modification $C(x,y)$ as follows:

$$C(x,y)=c(x,y)^\beta s(x,y)^\gamma,$$

$$c(x,y) = \frac{2\sigma_a \sigma_b + C_2}{\sigma_a^2 + \sigma_b^2 + C_2},$$

$$s(x,y) = \frac{\sigma_{ab} + C_3}{\sigma_a \sigma_b + C_3},$$

wherein $\sigma_a$, $\sigma_b$ are the standard deviations of image regions $f_a$ and $\sim f_b$, and $\sigma_{ab}$ is the covariance of $f_a$ and $\sim f_b$.

13. The method of claim 1, wherein the step of generating comprises executing, using the processor, a non-linear support vector regression (SVR) to compute the image retouching rating based upon the plurality of statistics and characterization data defining the training parameters of the SVR.

14. The method of claim 13, wherein the characterization data is defined by a plurality of perceived ratings received from a plurality of users each viewing a plurality of selected original images and a plurality of retouched images.

15. The method of claim 1, further comprising:
   determining, within a touchup filter, whether the retouched image is to be displayed by a browser based upon the image retouching rating and a rating threshold;
   displaying the retouched image within the browser when the retouched image is to be displayed; and
   displaying an image outline within the browser when the retouched image is not to be displayed;
   wherein the browser is in communication with a web server.

16. The method of claim 1, further comprising:
   defining, within a browser, a rating selector that specifies a maximum image retouching rating value for retouched images to be displayed within the browser;
   sending the maximum image retouching rating value to a web server in communication with the browser; and
   receiving a web page for display within the browser with at least one retouched image having an image retouching rating equal or less than the maximum rating value.

17. A system for generating a digital image retouching rating of a retouched image in comparison to an original image, the system comprising:
   a processor in communication with memory;
   an algorithm stored within the memory as computer readable instructions and executed by the processor to:
   (i) process the original image and the retouched image to determine a plurality of geometric statistics and a plurality of photometric statistics of differences between the original image and the retouched image, and (ii) generate the digital image retouching rating based upon at least the plurality of geometric statistics and the plurality of photometric statistics.

18. The system of claim 17, wherein the algorithm further comprises computer readable instructions stored in the memory and executed by the processor to:
(iii) model the plurality of geometric statistics with a motion field;
(vi) model the plurality of photometric statistics with a generic measure of local image similarity; and
(v) extract four geometric measurements from the modeled geometric statistics and four photometric measurements from the modeled photometric statistics;
wherein the algorithm generates the digital image retouching rating using a non-linear support vector regression (SVR) and the four geometric measurements, the four photometric measurements, and characterization data defining training parameters of the SVR.

19. The system of claim 17, further comprising computer readable instructions stored in memory and executed by the processor to issue the digital image retouching rating within a digitally signed certificate that identifies the retouched image.

20. The system of claim 17, further comprising computer readable instructions stored in memory and executed by the processor to embed the digital image retouching rating within the retouched image.

21. The system of claim 17, wherein the plurality of geometric statistics comprises:
a first mean and a first standard deviation of a geometric distortion between the original image and the retouched image corresponding to a first portion of a human body.

22. The system of claim 21, wherein the first portion of the human body is a portion of the face.

23. The system of claim 21, wherein the plurality of geometric statistics comprises: a second mean and a second standard deviation of a geometric distortion between the original image and the retouched image corresponding to a second portion of the human body, the second portion being different from the first portion.

24. The system of claim 23, wherein the processor executes the algorithm to implement an eight parameter model expressed by:

$cf_a(x,y)+b=f_b(m_1x+m_2y+t_x,m_3x+m_4y+t_y)$ wherein $f_a(x,y)$ and $f_b(x,y)$ are local regions of the original image and the retouched image, respectively, c and b are contrast and brightness terms, $m_i$ are terms of a two by two affine matrix, and $t_x$ and $t_y$ are translation terms.

25. The system of claim 24, wherein the geometric distortion is expressed by magnitude of a vector v(x,y) is expressed by $$\vec{v}(x,y) = \begin{pmatrix} m_1x + m_2y + t_x - x \\ m_3x + m_4y + t_y - y \end{pmatrix}.$$

26. The system of claim 17, wherein the plurality of photometric statistics comprises a third mean and a third standard deviation, between the original image and the retouched image, of the frequency response of a linear filter for the first portion of the human body.

27. The system of claim 26, wherein the frequency response is characterized by, $D = \Sigma_\omega |\tilde{F}_b(\omega)|\omega - \Sigma_\omega |H(\omega)\tilde{F}_b(\omega)|\omega$ wherein $H(\omega)$ and $\sim F_b(\omega)$ are unit-sum normalized one-dimensional (1D) frequency responses of the linear filter h(x,y) and a local region $\sim f_b$ which are computed by integrating their 2D Fourier transforms across orientation, and wherein each linear filter h(x,y) is characterized by:

$f_a(x,y)=h(x,y) \star \tilde{f}_b(x,y)$, wherein where $\star$ is the convolution operator, and $f_a$ and $f_b$ are a geometrically aligned after and before image region, respectively.

28. The system of claim 26, wherein the plurality of photometric statistics comprises a fourth mean and a fourth standard deviation of structural similarity (SSIM) between the original image and the retouched image.

29. The system of claim 28, wherein the SSIM is characterized by contrast and structural modification C(x,y) as follows:

$C(x,y)=c(x,y)^\beta s(x,y)^\gamma$, $$c(x,y) = \frac{2\sigma_a\sigma_b + C_2}{\sigma_a^2 + \sigma_b^2 + C_2},$$

$$s(x,y) = \frac{\sigma_{ab} + C_3}{\sigma_a\sigma_b + C_3},$$

wherein $\sigma_a$, $\sigma_b$ are the standard deviations of image regions $f_a$ and $\sim f_b$, and $\sigma_{ab}$ is the covariance of $f_a$ and $\sim f_b$.

30. The system of claim 29, wherein the characterization data is defined from a perceptual rating defined by each of a plurality of users for each of a plurality of original image and retouched image pairs.

31. The system of claim 17, wherein the algorithm comprises a non-linear support vector regression (SVR) to compute the image retouching rating based upon the plurality of statistics and characterization data.

* * * * *